(12) United States Patent
Kirillov et al.

(10) Patent No.: US 8,131,484 B2
(45) Date of Patent: Mar. 6, 2012

(54) METHOD FOR PREPROCESSING VIBRO-SENSOR SIGNALS FOR ENGINE DIAGNOSTICS AND DEVICE FOR CARRYING OUT THEREOF

(76) Inventors: Sergey Kirillov, Dimitrovgrad (RU); Aleksandr Kirillov, Vitebsk (BY); Nikolai Laskin, Toronto (CA)

( * ) Notice: Subject to any disclaimer, the term of this patent is extended or adjusted under 35 U.S.C. 154(b) by 222 days.

(21) Appl. No.: 12/661,285

(22) Filed: Mar. 15, 2010

(65) Prior Publication Data

US 2011/0224922 A1    Sep. 15, 2011

(51) Int. Cl.
*G01F 23/00* (2006.01)
*G06F 19/00* (2011.01)

(52) U.S. Cl. ............ 702/56; 702/66; 702/179; 702/182; 702/183

(58) Field of Classification Search .............. 702/56–69, 702/113–117, 182–191
See application file for complete search history.

(56) References Cited

U.S. PATENT DOCUMENTS

| | | | | |
|---|---|---|---|---|
| 4,899,710 A | * | 2/1990 | Takahashi | 123/406.35 |
| 5,745,382 A | * | 4/1998 | Vilim et al. | 706/16 |
| 7,403,850 B1 | * | 7/2008 | Boutin et al. | 701/107 |
| 2002/0087258 A1 | * | 7/2002 | Johnson | 701/114 |
| 2008/0053405 A1 | * | 3/2008 | Vigild et al. | 123/406.26 |

FOREIGN PATENT DOCUMENTS

| | | | |
|---|---|---|---|
| EP | 1774156 | * | 11/2009 |
| WO | WO 2006009312 | * | 1/2006 |

* cited by examiner

*Primary Examiner* — Phuong Huynh
(74) *Attorney, Agent, or Firm* — Aleksandr Smushkovich

(57) ABSTRACT

A method is provided for improved diagnostics of an internal combustion engine that includes cylinders, a crankshaft, crankshaft rotation angle sensor (CRAS), a vibro-sensor, a logic-mark sensor, each sensor produces respective signals. The method contemplates receiving the signals dividing them into a plurality of idling cycles, determining the crankshaft's position based on stochastic filtration, quasicontinuous representation of the signal, the Kalman filter, a nonlinear stochastic filter, based on CRAS characteristics and quasicontinuous representation, determining the Riesz generator basis function based on technical characteristics of the vibro-sensor, secondary discreeting of the signals with a replacement of argument, discreeting of a reciprocal function, obtaining a discrete wavelet transform, obtaining a continuous wavelet transform, obtaining a discrete wavelet transform of a reciprocal function, and producing output data. Two-dimensional arrays are divided relatively to predetermined indexes in the discrete transforms, an empirical probability distribution function is computed. Further optional diagnostic processing is provided.

3 Claims, 6 Drawing Sheets

METHOD FOR PREPROCESSING VIBRO-SENSOR SIGNALS FOR ENGINE DIAGNOSTICS AND DEVICE FOR CARRYING OUT THEREOF

FIELD OF THE INVENTION

The invention relates to systems and methods providing diagnostics and monitoring internal combustion engines, specifically to systems and methods for diagnostics of the engines based on analysis of at least engine vibrations.

BACKGROUND OF THE INVENTION

There exists a wide variety of diagnostic systems for combustion engines generally designed to detect present and future failures of such engines. Exemplarily, U.S. Pat. No. 7,403,850 to Boutin et al teaches an "automated fault diagnostic system" that "operates on engine-compressor sets with one vibration sensor per sub-group of engine cylinders and one sensor per compressor cylinder. Vibration signals linked to crankshaft phase angle windows ("VT") mark various engine events and compressor events. In data-acquisition-learning mode, VT is stored for each engine and compressor event per operating load condition, statistical process control (SPC) theory identifies alarm threshold bands. Operator input-overrides are permitted. If no baseline data is stored, the system automatically enters the learn mode. To monitor, current VT are obtained and current load condition is matched to the earlier load set and alarms issue linking predetermined engine or compressor event to the over-under VT. Baseline data, SPC analysis, alarms and monitoring are set for crankcase flow, engine cylinder exhaust temperatures, ignition system diagnostic messages. Compressor performance alarms use suction and discharge temperatures and pressures." Thusly, Boutin's system utilizes vibration signals linked to the crankshaft phase angle; in the data-acquisition-learning mode it identifies alarm threshold bands using the SPC theory.

Another example of such systems is "A system and method for detecting and determining knocking in an internal combustion engine in which various kinds of signals (engine vibrations, engine revolution speed, opening angle of a throttle valve, crank angle, ignition crank angle, and so on) are weighted by means of weight vectors so as to form a knocking decision signal. The knocking decision signal is compared with a reference signal so as to determine whether the knocking is occurring. The correctness or incorrectness of the determination result is determined on the basis of a highly accurate knocking detecting information provided by means of an external test device. The weight vectors are corrected in a direction in which the percentage of correct answers increases under the various engine operating conditions. The weight vectors thus corrected and learned are used to carry out highly accurate knocking detection under varying engine operating conditions. The process can be repeated as a part of normal servicing so as to compensate for the effects of aging" described in U.S. Pat. No. 4,899,710 to Takahashi. His system therefore analyses engine vibrations, crank angle, ignition crank angle, etc.

U.S. Pat. No. 5,745,382 to Vilim et al discloses "A method and system for performing surveillance of transient signals of an industrial device to ascertain the operating state. The method and system involves the steps of reading into a memory training data, determining neural network weighting values until achieving target outputs close to the neural network output. If the target outputs are inadequate, wavelet parameters are determined to yield neural network outputs close to the desired set of target outputs and then providing signals characteristic of an industrial process and comparing the neural network output to the industrial process signals to evaluate the operating state of the industrial process." Consequently, Vilim's system employs the 'neural network' approach for evaluation of the operating state of the device.

Another U.S. Pat. No. 6,456,928 to Johnson proposes "Methods and devices for detecting and predicting parameter deviations and isolating failure modes in systems that are subject to failure. In a preferred embodiment, methods are provided for use with engines, including aircraft, automobile, and industrial combustion engines. However, numerous other applications are contemplated. Such engines may be described as having monitor points having current parameter values, where the monitor points may correspond to single physical sensors or to virtual or inferred monitor points having parameter values derived from multiple sensors. Acceptable ranges, limits, and values for each of the monitor point parameters may be provided for use with the present invention. Parameters lying outside of the acceptable ranges may be said to be in deviation. Ambiguity groups, including one or more failure modes or physical causes of the parameter deviations may also be provided. Parameter deviations, after optional filtering, may generate deviation signals which may be followed by analysis of the ambiguity groups to isolate the failure mode or modes causing the deviation. Courses of engine operation ameliorating the failure mode may be suggested. Methods are also provided for projecting current trends into the future to predict deviations and isolate failure modes early, prior to actual occurrence. One preferred use for the methods is early detection and isolation of faults in aircraft engines, leading to corrective action including early preventative maintenance." In the instant inventors' opinion, the systems and methods, mentioned in U.S. Pat. No. 6,456,928, represent an advantageous approach of analysis that allows identifying the failure mode or modes causing the deviation from the normal regime.

Since this area of technology is vitally important not only for carmakers, but also for aviation, numerous research works have been conducted by respective organizations and companies, including those financed by NASA. Report NASA/CR-2002-211485 46 particularly states:

"The application of vibration monitoring is an obvious area of interest in the subject of engine, monitoring and diagnostics. Certain engine conditions such as bearing wear are best detected through vibration monitoring. The AGATE PMDS hardware was designed to optionally take information from a vibration sensor mounted directly on the engine, process the vibration data, and determine prognostics from that data. A university-led study performed under the Honeywell AGATE program has shown that, for piston engines, vibration monitoring can be used to detect engine conditions such as bearing wear. However, the team discovered that it was not sufficient to analyze the frequency spectrum of the vibration data as in traditional vibration monitoring methods, but rather to use a direct sample of the vibration time signal. This preliminary study used 5000 samples/second for one second of engine operation in order to detect engine conditions sufficient for prognostic prediction. Further research and development will be necessary before such optional vibration data can be used in a reliable fashion for engine prognostics . . . . The PMDS concept is intended to independently monitor the performance of the engine, providing continuous status to the pilot along with warnings if necessary. Specific sections of this data would be available to ground maintenance personnel via a special interface. The inputs to the PMDS include the digital engine controller sensors and other sensors. At its present stage of development, the PMDS monitors and records engine parameters and stores them into an engine history database for subsequent processing by off-line diagnostic algorithms . . . ." Although no tangible results have been shown, an important conclusion can be made: the Fourier series approach, which the vibration analysis has been traditionally based on, is recognized insufficient for further advancement in engine vibro-diagnostics.

The aforementioned systems and methods are also associated with certain deficiencies and shortcomings. Their vibration analysis primarily aims at the monitoring of aging and wear of mechanisms operatively engaged with each other. In addition, a majority of the methods encompass the combustion engine signal processing based on several assumptions that do not sufficiently reflect the real non-stationary nature of the signals and engine processes that cause such signals.

A large number of specialists have made numerous attempts to analyze the signals derived from operation of particular mechanisms (e.g. piston rings), which attempts have eventually failed due to the fact that their signals are just lost in the noise of the engine. This has lead to a common opinion of analyzing only revolving parts of the engine by means of the spectral analysis that implies the assumption of stationary nature of the signals.

Another approach has been taken in a second group of the diagnostic methods that is based on analyzing the signals in time. This approach requires a high qualification of the specialists, and is also characterized with instability and dependability on the place and manner of contact.

OBJECTIVES AND BRIEF SUMMARY OF THE INVENTION

It is generally desirable to provide (A) analysis of all or a majority of engine mechanisms (e.g. analysis of the operation of valves, injection devices, etc.) and determination of possible failures that cause incorrect operation of such mechanisms (e.g. a broken spring, etc.); (B) monitoring not only thermo-dynamical parameters of the combustion process, but also the dynamics of combustion and the dispersiveness of the combustion mixture; (C) analysis of hydro-gas-dynamics of the engine; and (D) determination of functional specifics of the mechanism's operation for the prediction of further behavior of such mechanisms and for discovering any changes of risks of future failures.

It is believed that in order to achieve the aforementioned goals, new methods of signal representation, as well as computing operations for their processing should be developed. Therefore, such methods and operations are of particular interest of the authors of instant invention. Specifically, the invention is dedicated to a new method, device, and computing means for preprocessing vibro-sensor (accelerometer) signals.

As stated above, the traditional 'classical methods' of vibro-diagnostics are based on the Fourier series amplitude-frequency analysis, also sometimes on broadband filtering, quantitative analysis with listening the high frequency broadband by the operator, etc. Typically, an accelerometer is mounted in a suitable place of the engine, and the accelerometer measures not only vibrations of the mechanical parts of engine, but also vibrations effected by an acoustic flow caused by the process of fuel mixture combustion. This leads to an increase of a stochastic component of the signal, since the combustion is a turbulent process that involves complicated stochastic factors.

Therefore, the vibro-sensor (accelerometer) signal is a combination of signals caused by at least two components of vibration sources: immediately by the mechanical parts ('mechanical component') and by the acoustic vibrations derived from the combustion process ('combustion component'). Besides, the mechanical component also includes a stochastic sub-component affected by compelling forces acting upon any mechanical part. The vibration signal of a combustion engine is not a subject of analysis by the 'classical methods', since they don't consider: the non-stationary nature of the signal, the quasi-periodical character of the signal (that is a source of diagnostic information by itself), and the stochastic combustion sub-component. The classical vibration diagnostics are based on a simply understood notion adopted by those skilled in the art with application of 'standard' mathematical approaches, not requiring high computing resources, whereas the physical nature of the stochastic sub-components cannot be described by the 'standard' set of parameters contemplated by the classical diagnostics, which, in turn, causes a problem.

The present invention is dedicated to solving the problem by providing a novel and unobvious method and computing operations for preprocessing the accelerometer signal taking into account the aforesaid factors: the non-stationary nature of the signal, the quasi-periodical character of the signal, and the stochastic combustion sub-component.

The present invention provides a new signal representation as a reduced length cycle through the creation of a general sampling that depends upon a variable, expressed as a rotation angle of the engine's crankshaft.

The present invention allows improving engine diagnostics, rendering them more precise, significantly reducing diagnostic costs, making the diagnostic service accessible to the mass consumer, since it's conducted in an automatic mode, utilizing conventional inexpensive sensors and digital oscillographs, and simple measurement techniques.

According to the present invention, a method for improved diagnostics of an internal combustion engine is provided; the engine includes at least two cylinders, a crankshaft, crankshaft rotation angle sensor (CRAS), a vibro-sensor, a logic-mark sensor, wherein each of them produces corresponding signals. The method contemplates receiving the corresponding signals; dividing them into a plurality of idling cycles; determining the crankshaft's position based on: stochastic filtration, quasicontinuous representation of the signal, the Kalman filter, a nonlinear stochastic filter, based on CRAS characteristics, and quasicontinuous representation; determining the Riesz generator basis function based on the technical characteristics of vibro-sensor; secondary discreeting of the signals with a replacement of argument; discreeting of a reciprocal function; obtaining a discrete wavelet transform; obtaining a continuous wavelet transform; obtaining a discrete wavelet transform of a reciprocal function, and producing output data. Two-dimensional arrays are divided relatively to predetermined indexes in the discrete transforms; and an empirical probability distribution function is computed. Further optional processing is also provided in two alternatives.

Figure 1:
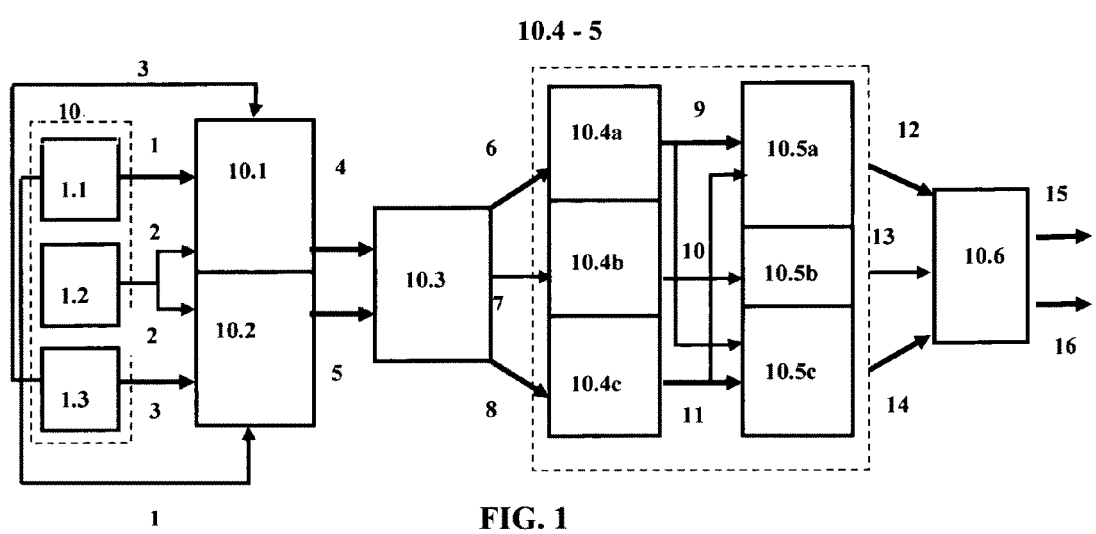
FIG. 1 is a generalized block-diagram showing a flow of signals within units of the preprocessing device, according to an embodiment of the present invention.

Each reference numeral indicated in the above listed figures is designated to an element of the inventive device or method described herein below. A first time introduced reference numeral in the description is enclosed into parentheses.

DESCRIPTION OF PREFERRED EMBODIMENTS OF THE INVENTION

While the invention may be susceptible to embodiment in different forms, there are shown in the drawing, and will be described in detail herein, specific embodiments of the present invention, with the understanding that the present disclosure is to be considered an exemplification of the principles of the invention, and is not intended to limit the invention to that as illustrated and described herein.

PPD Structure

A generalized block-diagram particularly showing a flow of signals within units of the inventive device (herein also called a 'preprocessing device' or 'PPD') is illustrated on FIG. 1. The PPD is used for diagnostics of an internal combustion engine (10) (shown on FIG. 1 by a dashed box), which engine generally including: at least two conventional cylinders (not shown); a conventional crankshaft (not shown); a conventional crankshaft rotation angle sensor (1.1), herein also called 'CRAS', capable of measuring rotation angles of the crankshaft, the CRAS possesses predetermined technical characteristics, including a pulse response characteristic; a conventional vibro-sensor (1.2), capable of functioning as an accelerometer, measuring acceleration of the engine vibrations, the vibro-sensor possesses predetermined technical characteristics; and a mark sensor (1.3) producing a logic mark-signal, marking a predetermined phase of operation of any selected (typically a first) cylinder of the combustion engine 10.

The PPD itself comprises: a unit (10.1) for obtaining a quasicontinuous representation of the CRAS signal; a unit (10.2) for obtaining a quasicontinuous representation of the vibro-sensor's signal; a unit (10.3) for secondary discreeting of the vibro-sensor signal time dependency with a replacement of the time argument with the rotation angle argument, and for a secondary discreeting of a reciprocal function to the CRAS signal; a unit (10.4a) for a discrete wavelet transform of the vibro-sensor signal after the secondary discreeting of the vibro-sensor signal with the replacement of argument; a unit (10.4b) for a discrete wavelet transform of a reciprocal function reciprocal to the CRAS signal; a unit (10.4c) for a continuous wavelet transform of the vibro-sensor signal after the secondary discreeting of the vibro-sensor signal with the replacement of argument ('lime' to 'rotation angle'); a unit (10.5a) for computation of empirical probability distribution functions of wavelet coefficients of the vibro-sensor signal; a unit (10.5b) for computation of empirical probability distribution functions of wavelet coefficients of the aforesaid reciprocal function; a unit (10.5c) for computation of a two-dimensional empirical probability distribution function of the aforesaid wavelet coefficients of the vibro-sensor signal; and a unit (10.6) for diagnostics. The units 10.4 (a,b,c) and 10.5 (a,b,c) are incorporated into a common block (10.4-5). All the aforementioned units are connected as shown on FIG. 1. The PPD also comprises a pre-programmed computing means, essentially a computer or a distributed computing network (e.g., a computer network system or a super-computer shown on FIG. 4), executing a number of predetermined programs, particularly containing a program validation means.

Signal Flows

Figure 2:
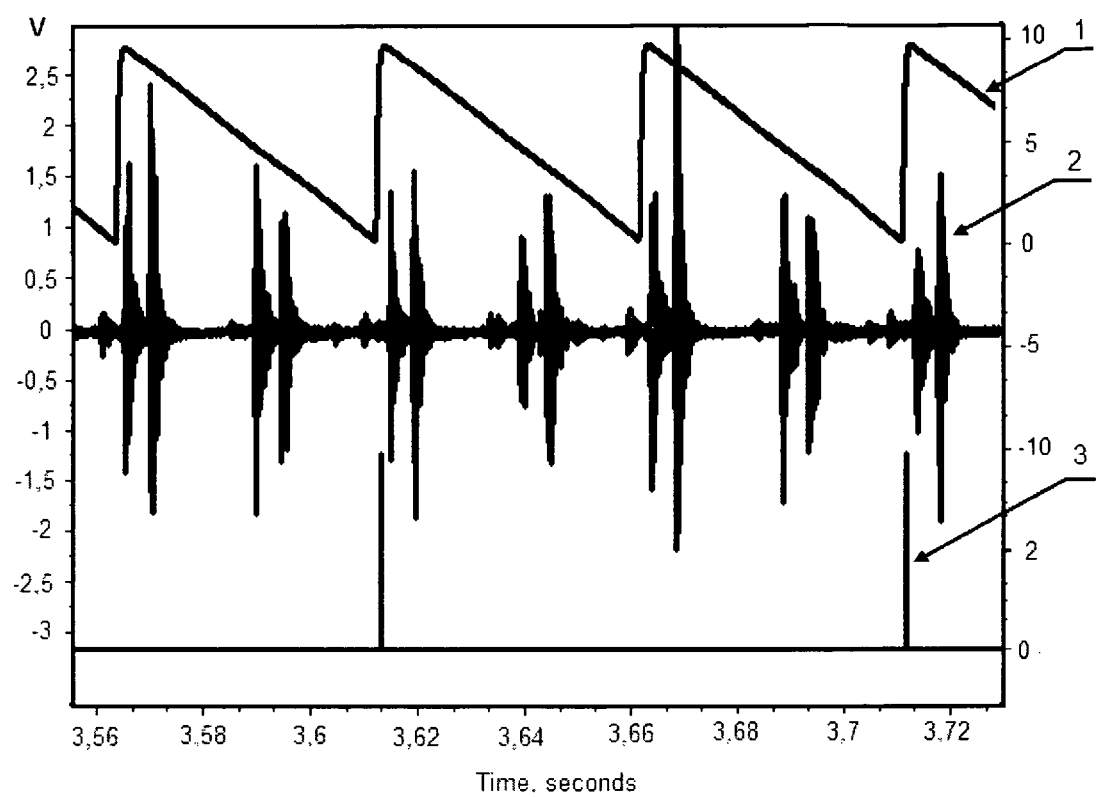
FIG. 2 is a graph showing three waveforms of: the crankshaft rotation signal, the accelerometer signal, and the first cylinder mark signal as functions of time, which signals are inputted into the preprocessing device.

Three signal waveforms are illustrated on FIG. 2: a digital crankshaft rotation signal (1) produced by the crankshaft rotation angle sensor 1.1, a digital signal (2) produced by the vibro-sensor 1.2 obtained in an idling mode, and a digital logic-mark signal (3) produced by the mark sensor 1.3. The signals 1, 2, and 3 are inputted into the PPD for preprocessing these signals.

The signals 1, 2, and 3 are also shown on FIG. 1, which further depicts the following signals: a crankshaft position signal (4), obtained as a result of the quasicontinuous representation of the signal 1; a vibro-curve signal (5), obtained as a result of the quasicontinuous representation of the signal 2; a vibro-signal divided into channels (6) and (8), obtained after the secondary discreeting of the vibro-sensor signal with the replacement of argument ('time' to 'rotation angle') represented in samples of the rotational angle of crankshaft; a signal of a reciprocal function (7), reciprocal to the CRAS signal, after the secondary discreeting; signals (9) of a plurality of fragments of discrete wavelet transform coefficients of the vibro-sensor signal; signals (11) of continuous wavelet transform coefficients of the vibro-sensor signal represented in samples of the rotational angle of crankshaft; signals of wavelet transform coefficients (10) of the aforesaid reciprocal function, reciprocal to the CRAS signal; a signal of a one-dimensional empirical probability distribution function (12) of the wavelet transform coefficients of the vibro-sensor signal; a signal of an alternative two-dimensional empirical probability distribution function (14) of the wavelet transform coefficients of the vibro-sensor signal; signals of empirical probability distribution functions (13) of the wavelet transform coefficients for the aforesaid reciprocal function reciprocal to the CRAS signal; a text-graphic diagnostic message (15); and an output signal (16) for further processing.

Method for Preprocessing Signals

Therefore, the inventive method of operation of the PPD comprises the following steps conducted in the unit 10.1. Step (a1) consists in inputting the aforesaid three signals 1, 2, and 3 into the unit 10.1. Thereafter, step (b1) at each mark signal 3, the vibro-sensor signal 2 is divided ('cut') into separate cycles, wherein each cycle corresponds to a rotation angle of the engine's crankshaft of 720 degrees, as shown on FIG. 2.

As a result, a plurality of idling cycles at fixed parameters (temperature of the engine, the turn angle of the throttle, etc.) of the engine work is formed. Step (c1) includes verification that idling cycles with varying parameters of the engine work are excluded from the idling cycle plurality by the program validation means (e.g. it does not include transient mode cycles, for instance, if the engine's throttle changes its position).

During the preprocessing of the signals, it is necessary to determine the actual crankshaft position based on the signal of the CRAS with maximum accuracy, and to transform the crankshaft signal in such a manner that the replacement of the time argument of the vibro-sensor signal by the rotation angle argument would be possible without loss of information. Therefore, the next step (d1) of signal pre-processing in the unit 10.1 is a more precise determination of the actual position of crankshaft based on a stochastic filtration and quasi-continuous representation of the CRAS signal by the scale continuation methods (i.e. on the basis of analogues of the Whittaker-Nyquist-Kotelnikov-Shannon theorem).

The signal 1 of the CRAS is presented in the unit 10.1 as a function of discrete time argument with a discreeting frequency (herein also called a 'sample rate') $\omega_{fR}$, defined by technical characteristics of the sensor. The CRAS signal is quasi-periodical (i.e. the difference between time intervals, which include a crankshaft turn from 0 to 360 degrees, is a random value).

The next step (e1) of the signal pre-processing in the unit 10.1 is a more precise determination of the actual position of crankshaft with the use of the known time-varying Kalman filter or a nonlinear stochastic filter. Thus the filter equations include crankshaft dynamics equations with a combustion torque. As a result of the filtration, the true position of crankshaft is expressed as a function $\phi(k)$ of a discrete time argument with a sample rate $\omega_{fR}$.

The next set of steps of the signal pre-processing in the unit 10.1 is a generation of a quasicontinuous representation of the signal of the function $\phi(k)$. It is made in two steps:

Step (f1) is a determination of the Riesz generator basis function based on the aforementioned technical characteristics of the CRAS and on approximation of the pulse response characteristic of the CRAS, using scale functions of the wavelet transformations or B-spline functions (see sources: "Wavelets, Approximation and Statistical Applications" W. Hardle, G. Kerkyacharian D. Picard, A. Tsybakov Ein erstes Ergebnis des Seminars Berlin-Paris, p. 284, 2000, Humboldt-Universit at zu Berlin, Deutschland; Universite Paris VII, France, which sources are hereby incorporated by reference).

Step (g1) is a generation of the signal 4, being a quasicontinuous representation of the signal 1, as a function of a quasicontinuous time argument; this step (g1) consists of selecting a sample rate $\omega_c$ of a quasicontinuous time argument and obtaining the quasicontinuous representation as a function of the quasicontinuous time argument, based on the following formula:

$$\varphi(k) \leftrightarrow \phi(t) = h \sum_k \psi_i \varphi_{i,k}(t),$$

wherein:

$\phi(t)$- is a function of quasicontinuous time argument;

$\varphi_{i,k}(t)$- is the Riesz basis generator function;

$i, k, M$- are integers;

$$\psi_i = \sum_{k \in [i-M; i+M]} \varphi(k)$$

$h = 1/\omega_c$

Then the signal 4, being the quasicontinuous representation $\Phi(t)$ of the signal 1, is passed to the unit 10.3 for further processing.

The vibro-sensor signal is a function of a time argument with a sample rate $\omega_{fa}$. The sample rate $\omega_{fa}$ is determined by the aforesaid technical characteristics of the vibro-sensor. Typically, the sample rates $\omega_{fa}$ and $\omega_{fR}$ are not equal (usually $\omega_{fa} \gg \omega_{fR}$).

The inventive method further comprises a processing in the unit 10.2. Firstly, the aforesaid three signals 1, 2, and 3 are inputted into the unit 10.2, similarly as it's done at the step (a1). The unit 10.2 further provides for obtaining a quasicontinuous representation of the vibro-sensor signal 2. It is made in the following two steps.

Step (a2): a determination of the Riesz basis generator function based on technical characteristics of the vibro-sensor and on approximation of the pulse response characteristic using the scaling functions of wavelet transformations or using B-splane functions.

Step (b2): calculating the signal 5, being a quasicontinuous representation for the signal 2, with a sample rate $\omega_c$ based on the following formula:

$$s(k) \leftrightarrow S(t) = h \sum_k s_i \phi_{i,k}(t),$$

$S(t)$- is a function of quasicontinuous time argument;

$\varphi_{i,k}(t)$- is the Riesz basis generator function;

$i, k$- are integers;

$$s_i = \sum_{m \in [i-N; i+N]} s(m)$$

$h = 1/\omega_c$

Then the so obtained signal 5, being the quasicontinuous representation $S(t)$ of the signal 2, is passed to the unit 10.3 for further processing.

Thereafter, the unit 10.3 receives the signal 4 and the signal 5, and provides: a step (a3) for obtaining the signal 6 and the signal 8, both being a secondary discreeting of the vibro-sensor signal 5 (being the quasicontinuous representation of the signal 2) with a replacement of argument ('time' to 'rotation angle'); and a step (b3) for obtaining the signal 7, being a secondary discreeting of a reciprocal function (reciprocal to the signal 4). It is made in the following two sub-steps:

Sub-step (b31) is a determination of a sample rate $\omega_\phi$ for a rotation angle argument $$\varphi_i = \frac{i}{\omega_\varphi},$$

wherein i=1, 2, ..., n of the vibro-sensor signals.

Sub-step (b32) is a determination of a sample rate $\omega_\phi$ for a rotation angle argument $$\varphi_i = \frac{i}{\omega_\varphi}$$

for the CRAS signal. For every i=1, 2, ... n from a quasicontinuous representation $\Phi(t)$ of the CRAS signal 1, a j integer is determined, such that $|\Phi(jh)-\phi_i|=\inf_m|\Phi(mh)-\phi_i|$. At this, a value of the vibro-sensor signal is determined as a function of a discrete angular argument with the sample rate $\omega_\phi$ for everyone $\phi_i$ as follows:

$$S'(\varphi_i) \stackrel{def}{=} \{S(t): t = jh, |\phi(jh) - \varphi_i| = \inf_m |\phi(mh) - \varphi_i|\}$$

This ends the process of the secondary discreeting of the vibro-sensor signal with the argument replacement ('time' to 'rotation angle'). The so calculated values of pairs (jh, $\phi_i$) define the secondary discreeting of the reciprocal function $t_i = \Phi^{-1}(\phi_i)$, reciprocal to the signal 4, with the sample rate $\omega_\phi$, i.e.

$$t_i = \phi^{-1}(\varphi_i) \stackrel{def}{=} \{jh: |\phi(jh) - \varphi_i| = \inf_m |\phi(mh) - \varphi_i|\}.$$

Then the vibro-sensor signal S'($\phi_i$), denoted on FIGS. 1 as 6 and 8, and the signal 7, being a secondary discreeting of the reciprocal function $\Phi^{-1}(\phi_i)$, reciprocal to the signal 4, are passed into the block 10.4-5 for further processing.

Figure 4:
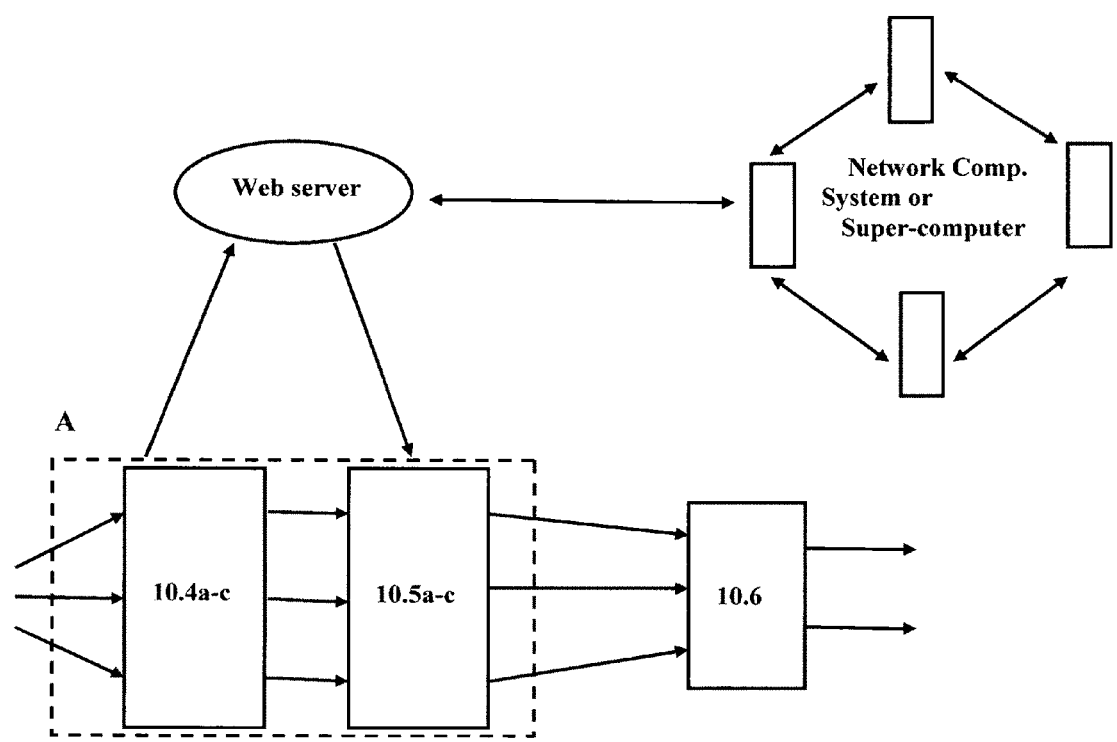
FIG. 4 is a graphical representation of operation of the preprocessing device, according to an embodiment of the present invention.

The block 10.4-5 (shown on FIG. 1) provides for a further preprocessing of the signals 6, 7, and 8 by either: transmitting the signals via the Internet (intranet) to a server computer of a predetermined computing power, or by utilizing known de-paralleling methods followed by processing in a parallel processor of a predetermined computing power (schematically shown on FIG. 4).

Figure 3A:
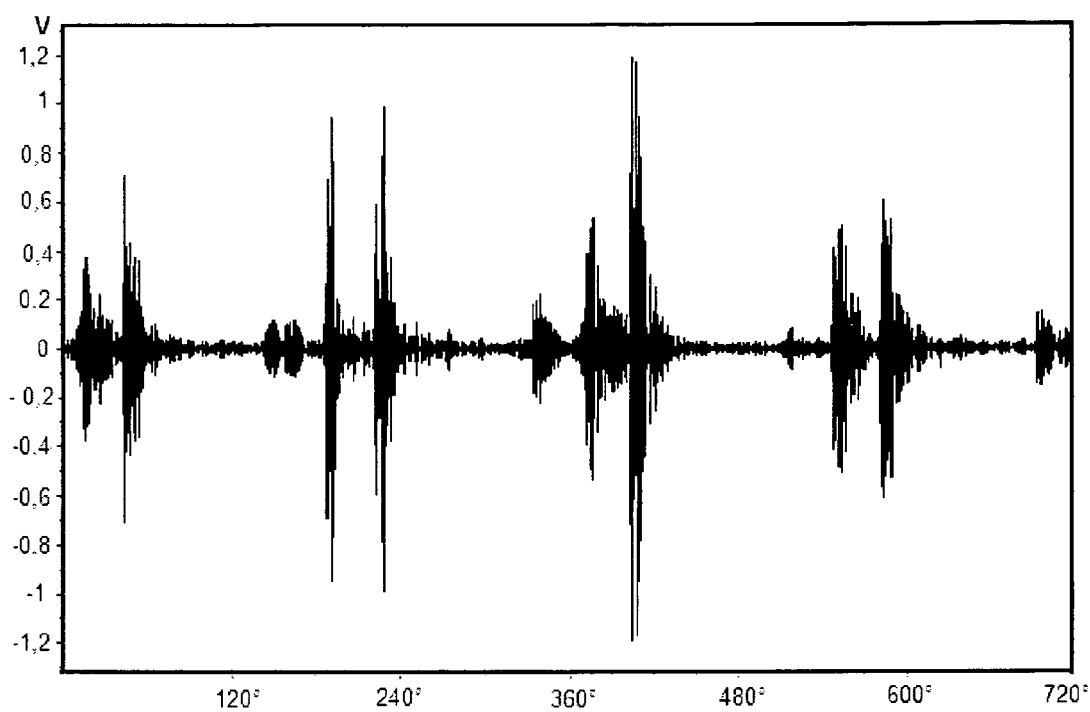
FIGS. 3 (a, b, c) are graphs showing components of a discreet wavelet decomposition for various scales as a function of crankshaft angle phase.
Figure 3B:
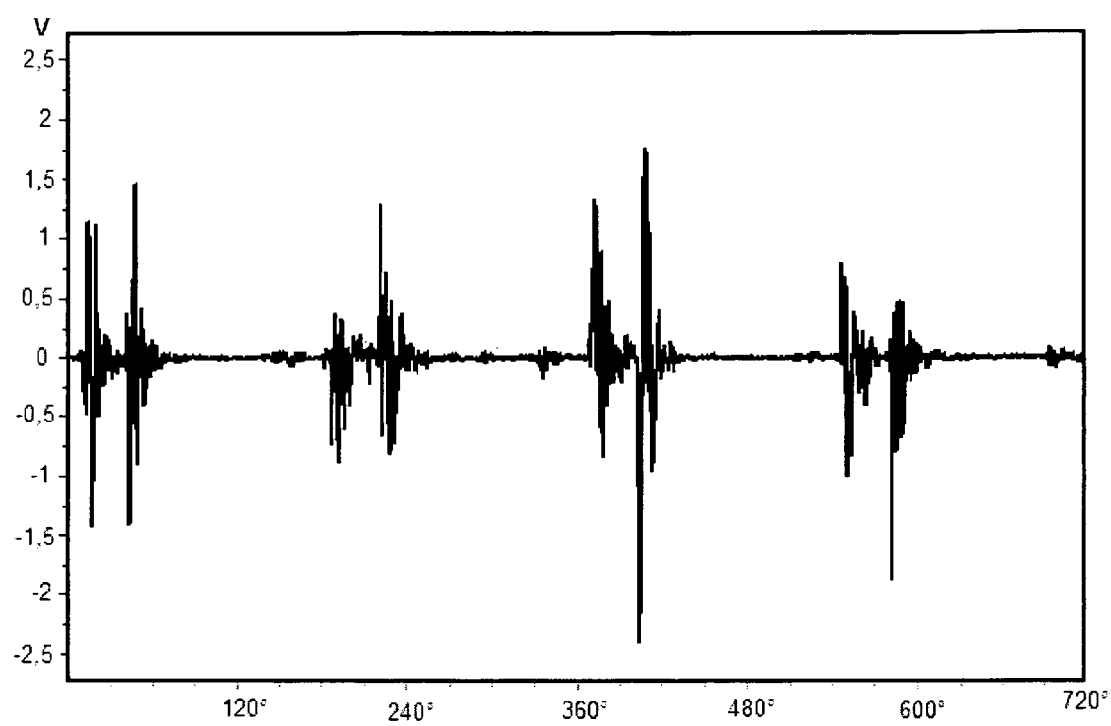
Figure 3C:
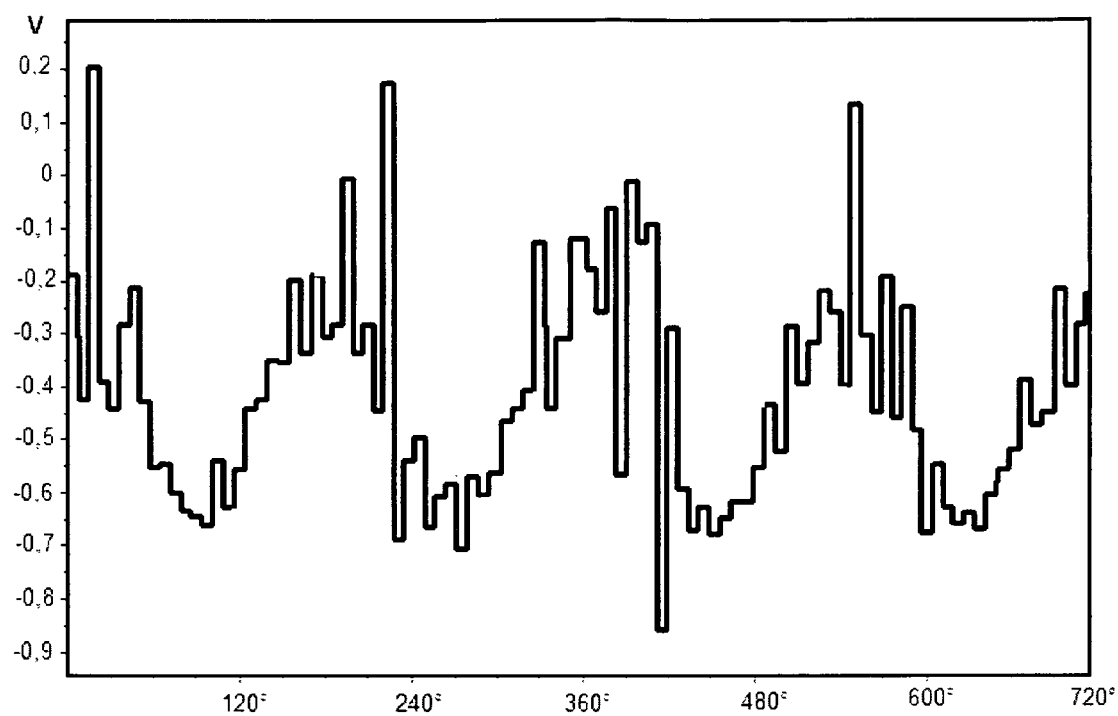

The next set of operations of the signal pre-processing in the units 10.4 (a, b, c) is: a step (a4) for obtaining a discrete wavelet transform (in the unit 10.4a) of the signal 6 (the vibro-sensor signal after the secondary discreeting with the replacement of argument), illustrated on FIGS. 3 (a, b, c); a step (b4) for obtaining a continuous wavelet transform (in the unit 10.4c) of the signal 8 (the vibro-sensor signal after the secondary discreeting with the replacement of argument); and a step (c4) for obtaining a discrete wavelet transform (in the unit 10.4b) of the reciprocal function, reciprocal to the CRAS signal 4, and producing output data including a number of two-dimensional arrays of predetermined coefficients, aforesaid two-dimensional arrays include pair elements, aforesaid two-dimensional arrays are represented by the signal (10). It is made in the following three sub-steps.

Sub-step (c41) (in the unit 10.4a) is a discrete wavelet transform of the vibro-sensor signal with the representation of output data (i.e. the signal 9), as a two-dimensional array for scale wavelet coefficients $u_{j,k}$, and as a two-dimensional array for detail coefficients $w_{j,k}$.

Sub-step (c42) (in the unit 10.4c) is a continuous wavelet transform of the vibro-sensor signal with a sub-step for the scaling arguments, and for the angular arguments with output data, represented by the signal 11, as two-dimensional arrays for wavelet coefficients $w_{a,b}$.

Sub-step (c43) (in the unit 10.4b) is a discrete wavelet transform with the Haar kernel of a function, reciprocal to the CRAS signal 4, with output data represented by the signal 10, as a two-dimensional array for scaling wavelet coefficients $u_{i,k}^H$, and as a two-dimensional array for detail coefficients $w_{i,k}^H$. Thereafter, the two-dimensional arrays are passed (as shown on FIG. 1) in the form of signals 9, 10, and 11 from the units 10.4a, 10.4b, and 10.4c into the units 10.5a, 10.5b, and 10.5c for further processing.

The units 10.5a, 10.5b, and 10.5c execute a respective step (a5) for dividing the two-dimensional arrays (i.e. $u_{j,k}$, $w_{j,k}$, $w_{a,b}$, $u_{i,k}^H$, $w_{i,k}^H$) relatively to a k index in the discrete transforms (obtained during the sub-steps (c41) and (c43)) and relatively to a b index in the continuous transform (obtained during the sub-step (c42)) into a plurality of equal fragments of the crankshaft rotational angles from 0 to 720 degrees. Thereby, the two-dimensional arrays are represented in the form: $^N w_{j,k}, ^N u_{j,k}, ^N w_{ja,b}, ^N u_{i,k}^H, ^N u_{i,k}^H$, wherein N=1, 2, ... is a number of full cycles of the engine.

Then the units 10.5a and 10.5b provide for further processing in a step (b5) for computations of a one-dimensional empirical probability distribution function for each element of the two-dimensional arrays (i.e. $w_{j,k}$, $u_{j,k}$, $w_{a,b}$, $u_{i,k}^H$, $u_{i,k}^H$), (usable, e.g., for discovering a disordered mechanism). Such one-dimensional empirical probability distribution functions are represented by: the signal 12 (for the empirical probability distribution functions of wavelet coefficients of accelerometer signal), and the signal 13 (for the empirical probability distribution functions wavelet coefficients of a function, reciprocal to the CRAS signal 4), the signals 12 and 13 are being the outputs of the units 10.5a and 10.5b respectively.

Alternatively, the unit 10.5c provides for a further processing step (c5) for a computation of a two-dimensional empirical probability distribution function (usable, e.g., for discovering a cause of a mechanism's disorder) for each pair of elements of the two-dimensional arrays (e.g. $F(w_{j,k}, w_{l,m})$, $F(u_{j,k}, w_{l,m})$, $F(w_{a,b}, w_{a^1,b^1})$, $F(u_{i,k}^H, w_{l,m})$, etc). Such two-dimensional empirical probability distribution function is represented by the signal 14.

The output signals 12, 13, and 14 respectively from the units 10.5a, 10.5b, and 10.5c are further conveyed to the unit 10.6.

The above-described pre-processing algorithm contemplates the non-stationary nature of the stochastic components of signals, their quasi-periodical character, and the stochastic combustion components, and thereby allows accomplishing the above stated objectives of the present invention.

Optional Diagnostic Continuations

The below-described diagnostic processing is an exemplary option. It is preferably conducted in the diagnostics unit 10.6, and comprises: a pairwise comparison of the obtained empirical probability distribution functions of elements of the two-dimensional arrays of (the aforesaid output data in the form of signals 9, 10, 11) on 'similar intervals' (i.e. intervals differing by an angular shift $4\pi i/n$, i=1, 2 ..., n−1, wherein n is a number of the engine cylinders, and the 'similar intervals' are defined as follows:

$$[\varphi_{i_1}, \varphi_{i_2}] \stackrel{def}{\longrightarrow} [\varphi_{i_1} + 4\pi i/n, \varphi_{i_2} + 4\pi i/n]).$$

The specifics of next steps (a6) and (b6) are: the alternative of step (b5) is chosen; a plurality of predetermined etalon probability distribution functions is established, these etalon probability distribution functions have predetermined etalon characteristic; the one-dimensional empirical probability distribution functions, obtained at the step (b5) and represented by the signals 12 and 13, have predetermined structure characteristics and metric characteristics; a chronological database of the engine and/or a mechanism of the engine is provided for storing previous empirical probability distribution functions of elements of the two-dimensional arrays, represented by the signals 9, 10, and 11 obtained from previous diagnostic tests of the engine, previous empirical probability distribution functions have 'previous' structure and 'previous' metric characteristics. These steps are described below in more detail.

Step (a6) for a pairwise comparison made on the similar intervals, on the basis of calculation of distances between the empirical probability distribution functions, obtained at the step (b5) above, and represented by the signals 12 and 13, within the following known probability metric characteristics:

M1. The Levy metrics, defined as:

$$d(F, G) \stackrel{def}{=} \{infh: F(w_{j,k} - h) - h \le G(w_{j,k}) \le F(w_{j,k} + h) + h,$$

M2. The metrics defined based on a density of the Radon-Nikodim theorem, as follows:

$$d(P, P') \stackrel{def}{=} \left\{ \int_\Omega |\psi - \psi'| dQ \right\}^{1/2},$$

wherein $$Q = \frac{1}{2}(P + P')$$

$$\psi = \left(\frac{dP}{dQ}\right)^{1/2},$$

$$\psi' = \left(\frac{dP'}{dQ}\right)^{1/2} - \text{the density of Radon} - \text{Nikodim}$$

M3. Mahalanobis distance.

The above comparison in the step (a6) is also made on the basis of calculation of the following structure characteristics of the empirical probability distribution function:

moments of the empirical probability distribution functions, and their rational expressions; and the Hurst index.

The next set of operations of the signal pre-processing in the diagnostics unit 10.6 is a comparison of the obtained empirical probability distribution function of the two-dimensional array elements represented by the signals 12 and 13, with an etalon probability distribution functions of elements of the two-dimensional arrays on the same interval $[\phi_{i_1}, \phi_{i_2}]$. It is made as follows.

Step (b6) for a comparison made on the same intervals, on the basis of calculation of distances between the empirical probability distribution functions obtained at the step (b5) above, represented by the signals 12 and 13, and the etalon probability distribution function of the elements of two-dimensional arrays, within the following above-discussed probability metric characteristics:

M1. The Levy metrics;
M2. The metrics on the base of the density of Radon-Nikodim.
M3. The Mahalanobis distance.

The above comparison is also made on the basis of calculation of predetermined characteristics of the empirical probability distribution function and characteristics of the predetermined etalon probability distribution function, wherein the predetermined structure characteristics are:

moments of the empirical probability distribution function, and their rational expressions; and the Hurst index.

The further steps are: Step (c6) for obtaining previous structure characteristics and previous metric characteristics from the previous empirical probability distribution functions stored in the chronological database, obtained from the previous diagnostic cycles. In the other words, the structure characteristics are retrieved from the database.

Step (d6) for a comparison made on the same intervals, on the basis of calculation of distances between the empirical probability distribution functions obtained at the step (b5) above, represented by the signals 12 and 13, with the previous empirical probability distribution functions of elements of the two-dimensional arrays stored in the chronological database, within the following above-discussed probability metric characteristics:

M1. The Levy metrics;
M2. The metrics on the base of the density of Radon-Nikodim.
M3. The Mahalanobis distance.

The above comparison in the step (d6) is made on the basis of calculation of the structure characteristics of the empirical probability distribution function obtained at the step (b5) above, and represented by the signals 12 and 13, and the structure characteristics of the previous probability distribution functions stored in the chronological database of the individual engine, and/or mechanism, wherein the structure characteristics are:

moments of the empirical probability distribution function, and their rational expressions; and the Hurst index.

An alternative set of operations of the signal pre-processing in the unit 10.6 is: providing a chronological database of the individual engine and/or a mechanism of the engine, wherein the database stores previous two-dimensional empirical probability distribution functions of elements of the two-dimensional arrays (the output data represented by the signals 9, 10, 11), wherein previous two-dimensional empirical probability distribution functions are obtained from previous diagnostic tests of the engine, and these two-dimensional previous empirical probability distribution functions have certain 'previous' structure and metric characteristics. The unit 10.6 also provides a comparison of the obtained two-dimensional empirical probability distribution function of the two-dimensional array elements, obtained at the step (c5) above, and represented by the signal 14, with the previous empirical probability distribution functions of elements of the two-dimensional arrays stored in the chronological database.

The processing is employed for discovering a cause of a mechanism's disorder or a "root cause diagnostic", and is conducted in the unit 10.6, and comprises the following steps: step (e6) for a pairwise comparison (on the similar intervals) of the two-dimensional empirical probability distribution functions of chronologically ordered pair elements of the two-dimensional array (the signals 9, 10, 11), obtained at the step (c5) above, and represented by the signal 14; step (f6) for comparison (on the same intervals) of the two-dimensional empirical probability distribution functions (represented by the signal 14) of the two-dimensional arrays (the signals 9, 10, 11) chronologically ordered pair elements with an etalon; step (g6) for obtaining the previous structure characteristics and the previous metric characteristics from the previous empirical probability distribution functions stored in the chronological database; step (h6) for comparison of the predetermined structure characteristics and the predetermined metric characteristics respectively with the previous structure characteristics and the previous metric characteristics obtained at the step (g6). The steps (e6), (f6), (g6) and (h6) are provided analogously to the respective steps (a6), (b6), (c6), and (d6), described above. The steps (e6), (f6), (g6), and (h6) are made for the following purposes:

Step (e6) is provided for pairwise comparison of the predetermined structure characteristics and the predetermined metric characteristics;

Step (f6) is provided for comparison of the predetermined structure characteristics and the predetermined metric characteristics with the corresponding predetermined etalon characteristics.

Step (g6) is provided for obtaining the previous structure characteristics and the previous metric characteristics from the previous empirical probability distribution functions stored in the chronological database;

Step (h6) is provided for comparison of the predetermined structure characteristics and the predetermined metric characteristics respectively with the previous structure characteristics and the previous metric characteristics obtained at the step (g6).

The comparison of the steps (e6), (f6), and (h6) is made on the basis of calculation of distances between the two-dimensional probability distribution functions and calculation of distances between differences of two-dimensional probability distribution function and a product of two one-dimensional probability distribution functions (i.e. $F(w_{j,k},w_{l,m})-F(w_{j,k})F(w_{l,m})$ and $F(u_{i,k}{}^H,w_{l,m})-F(u_{i,k}{}^H)F(w_{l,m})$) within the above-discussed probability metrics:

M1. The Levy metrics for two-dimensional functions; and
M2. The metrics on the base of the density of Radon-Nikodim.

The above comparison is also made on the basis of calculation of the structure characteristics of the two-dimensional empirical probability distribution function obtained at the step (b5) above, and represented by the signals 14, and the structure characteristics of the previous two-dimensional probability distribution functions stored in the chronological database of the individual engine, and/or mechanism, wherein the structure characteristics are:

higher moments of the two-dimensional empirical probability distribution function, and their rational expressions.

As shown on FIG. 1, the unit 10.6 produces the text-graphic diagnostic message 15, and the output signal 16 that can be used for further diagnostics analysis. As noted above, the steps (a6)-(g6) are optional. In alternative embodiments, the actual diagnostics might be accomplished in another way.

We claim:

1. A method for diagnostics of at least one internal combustion engine, said engine includes: at least two cylinders; a crankshaft; a crankshaft rotation angle sensor (CRAS) measuring rotation angles of said engine and possessing predetermined technical characteristics, including a pulse response characteristic; a vibro-sensor measuring vibrations of said engine, said vibro-sensor possesses predetermined technical characteristics, including a pulse response characteristic; a logic-mark sensor marking a predetermined phase of operation of a predetermined cylinder, selected from said at least two cylinders; said method includes preprocessing a number of signals received substantially from said engine; said number of signals include:

a CRAS signal (1) produced by said CRAS,
a vibro-sensor signal (2) produced by said vibro-sensor, and
a logic-mark signal (3) produced by said logic-mark sensor;

said method comprising the steps of:
a1) receiving said signals (1), (2), and (3) accordingly from said CRAS, said vibro-sensor, and said logic-mark sensor;
b1) at each said signal (3), dividing the signal (2) into a plurality of idling cycles, wherein each said idling cycle corresponds to a rotation angle of the crankshaft of 720 degrees;
c1) verifying exclusion of idling cycles with varying parameters from said plurality of idling cycles;
d1) determining, using a computer processor, an actual position of said crankshaft based on a stochastic filtration and quasicontinuous representation of the signal (1);
e1) determining, using a computer processor, an actual position of said crankshaft based on the time-varying Kalman filter or a nonlinear stochastic filter;
f1) determining the Riesz generator basis function based on said predetermined technical characteristics of the CRAS and approximation of said pulse response characteristic;
g1) generating a signal (4) being a quasicontinuous representation of the signal (1);

a2) determining the Riesz basis generator function, based on said predetermined technical characteristics of the vibro-sensor and on said pulse response characteristic of the vibro-sensor;
b2) generating a signal (5) being a quasicontinuous representation of the signal (2);
a3) obtaining a signal (6) and a signal (8), both being a secondary discreeting of the signal (5) with a replacement of argument;
b3) obtaining a signal (7), being a secondary discreeting of a reciprocal function, reciprocal to the signal (4);
a4) obtaining a discrete wavelet transform of the signal (6), said discrete wavelet transform is represented by a signal (9);
b4) obtaining a continuous wavelet transform of the signal (8), said continuous wavelet transform is represented by a signal (11);
c4) obtaining a discrete wavelet transform of a function, reciprocal to the signal (4), and producing output data including a number of two-dimensional arrays of predetermined coefficients, said two-dimensional arrays include pair elements, said two-dimensional arrays are represented by a signal (10);
a5) dividing said two-dimensional arrays relatively to a predetermined index in the discrete transforms of steps (a4) and (c4), and relatively to a predetermined index in the continuous transform of step (b4); and
either b5) computing, using a computer processor a one-dimensional empirical probability distribution function for each element of said two-dimensional arrays, said one-dimensional empirical probability distribution functions are represented by signals (12) and (13); or
c5) computing, using a computer processor a two-dimensional empirical probability distribution function for each said pair element of said two-dimensional arrays, said two-dimensional empirical probability distribution functions are represented by a signal (14);
wherein the step (c5) is provided as an alternative of the step (b5) and the step (b5) is provided as an alternative of the step (c5).

2. The method according to claim 1, wherein the alternative of step (b5) is chosen; a plurality of predetermined etalon probability distribution functions is established, said etalon probability distribution functions having predetermined etalon characteristic; said one-dimensional empirical probability distribution functions, obtained at the step (b5) and represented by the signals (12) and (13), have predetermined structure characteristics and metric characteristics; a chronological database of said engine and/or a mechanism of the engine is provided for storing previous empirical probability distribution functions of elements of the two-dimensional arrays, represented by the signals (9), (10), and (11) obtained from previous diagnostic tests of said engine, said previous empirical probability distribution functions having previous structure characteristics and previous metric characteristics; said method further comprising the steps of
a6) a pairwise comparison of said predetermined structure characteristics and said predetermined metric characteristics;
b6) a comparison of said predetermined structure characteristics and said predetermined metric characteristics with the corresponding said predetermined etalon characteristics;
c6) obtaining said previous structure characteristics and said previous metric characteristics from said previous empirical probability distribution functions stored in said chronological database; and d6) a comparison of said predetermined structure characteristics and said predetermined metric characteristics respectively with said previous structure characteristics and said previous metric characteristics obtained at the step (c6).

3. The method according to claim 1, wherein the alternative of step (c5) is chosen; a plurality of predetermined etalon two-dimensional probability distribution functions is established, said etalon two-dimensional probability distribution functions having predetermined etalon characteristic; said two-dimensional empirical probability distribution functions, obtained at the step (c5) and represented by the signal (14), have predetermined structure characteristics and metric characteristics; a chronological database of said engine and/or a mechanism of the engine is provided for storing previous empirical two-dimensional probability distribution functions of elements of the two-dimensional arrays, represented by the signals (9), (10), and (11) obtained from previous diagnostic tests of said engine, said previous two-dimensional empirical probability distribution functions having previous structure characteristics and previous metric characteristics; said method further comprising the steps of:

e6) a pairwise comparison of said predetermined structure characteristics and said predetermined metric characteristics;

f6) a comparison of said predetermined structure characteristics and said predetermined metric characteristics with the corresponding said predetermined etalon characteristics; and g6) obtaining said previous structure characteristics and said previous metric characteristics from said previous empirical probability distribution functions stored in said chronological database; and h6) a comparison of said predetermined structure characteristics and said predetermined metric characteristics respectively with said previous structure characteristics and said previous metric characteristics obtained at the step (g6).

\* \* \* \* \*